FIXED-PERIODICITY MONITORING AND CONTROL SYSTEM

Filed Jan. 31, 1957 2 Sheets-Sheet 1

INVENTOR.
PETER L. LINDLEY
BY
Walter Schilpp
ATTORNEY

FIXED-PERIODICITY MONITORING AND CONTROL SYSTEM

Filed Jan. 31, 1957 2 Sheets-Sheet 2

INVENTOR.
PETER L. LINDLEY

BY

Walter Schilpp
ATTORNEY

United States Patent Office 2,968,803

Patented Jan. 17, 1961

2,968,803

FIXED-PERIODICITY MONITORING AND CONTROL SYSTEM

Peter L. Lindley, Berwyn, Pa., assignor to Burroughs Corporation, Detroit, Mich., a corporation of Michigan Filed Jan. 31, 1957, Ser. No. 637,499

9 Claims. (Cl. 340—271)

This invention relates to a period-sensitive control system, and particularly to a system for sensing variations in the rotational speed of apparatus intended to rotate at constant speed.

While not limited thereto, the system of the present invention was developed as a protective device for a magnetic-disk memory in an electronic data-processing system, and it will be convenient to describe specifically the invention in that environment. Of course the broader applications of the invention will also be pointed out.

As is well known, in order to achieve high information density in a magnetic recording medium, it is desirable to position the electromagnetic transducers, i.e., the magnetic heads used for reading and/or writing, as close as possible to the magnetic surface without, however, making actual contact therewith. Moreover, uniformly close spacing is desirable in order to avoid nonuniformity in the strength of the recorded or read signal. Uniformly close spacing is somewhat difficult to achieve, however, in a magnetic-disk system since the disks, particularly if they be of large size, tend to become warped and distorted to some extent and the spacing between the magnetic heads and the rotating magnetic surface of the disk tends to vary. Consequently, if a magnetic head be adjusted for close spacing at a high spot on the disk, the spacing at a low spot will be too great for high pulse-packing density to be achieved, while if the adjustment for close spacing be made at a low spot, contact with the disk will occur at a high spot.

The above difficulty has been overcome, in one form of construction, by supporting the magnetic heads in a mounting which provides resiliency in the direction normal to the magnetic surface, as by a solenoid which urges the head toward the disk surface by a force which does not fully overcome an opposing force created by a stream of air directed from a suitably positioned jet to form an air cushion between the head and the disk surface.

In another form of construction, the air movement generated by the high speed rotation of the disk itself has been used to provide the air cushion needed to prevent the resiliently-mounted solenoid-actuated magnetic heads from contacting the surface of the disk. Such a construction is described in the copending application of Best et al., Serial No. 590,286, filed June 8, 1956.

In the form of construction described in the Best et al. application, if the rotational speed of the disk should be lessened by some fault which does not open the motor circuit, as by some sort of drag, the air cushion would be decreased and there would be the danger that the force of the solenoid urging the head toward the disk surface would be sufficient to overcome the opposing force interposed by the self-generated air cushion, with the result that the head would come into contact with the disk surface, causing damage thereto and probably also to the head.

One object of the present invention, therefore, is to provide, in a data processing system employing a magnetic-disk memory in which the heads are air floated by a self-generated air cushion, means capable of sensing deceleration of the disk from its intended normal rotational speed.

A further object is to provide, in response to a signal sensing such deceleration, means capable of effecting retraction of the magnetic heads, and/or of shutting off the motor, and/or of actuating an alarm mechanism.

A broad object of the present invention is to provide means for detecting a deviation in either direction from the normal constant speed at which a device is intended to rotate.

Another broad object is to provide means for detecting deviation in either direction from a fixed periodicity of movement of a moving body.

These and other objects are accomplished, in accordance with a preferred embodiment of the present invention as used in a magnetic-disk memory, by the provision of an electronic system which reads from the rotating disk one signal for each revolution thereof and which uses the signals read for two purposes as follows: (*a*) to derive from each signal a delayed pulse which lags the signals by an interval longer, by about one-half of the total deviation error to be tolerated, than the interval between signals when the disk is rotating at its intended normal speed, and (*b*) to use each succeeding signal to close, for a short period of time equal to the total deviation error to be tolerated, a gate to which the delayed pulse derived from the preceding signal is applied. Thus, passage of the delayed pulse through the gate is inhibited when the succeeding signal read from the disk is "on time," but passage of the delayed pulse through the gate is permitted if the succeeding signal is either early or late. The delayed pulse which passes through the gate may be treated as an alarm signal and may be used to actuate an alarm system, and/or to actuate mechanism to withdraw the transducer heads, and/or to shut off the driving motor.

While the foregoing is a summary, the invention will be best understood from a consideration of the following detailed description taken together with the drawing wherein.

Figure 1:
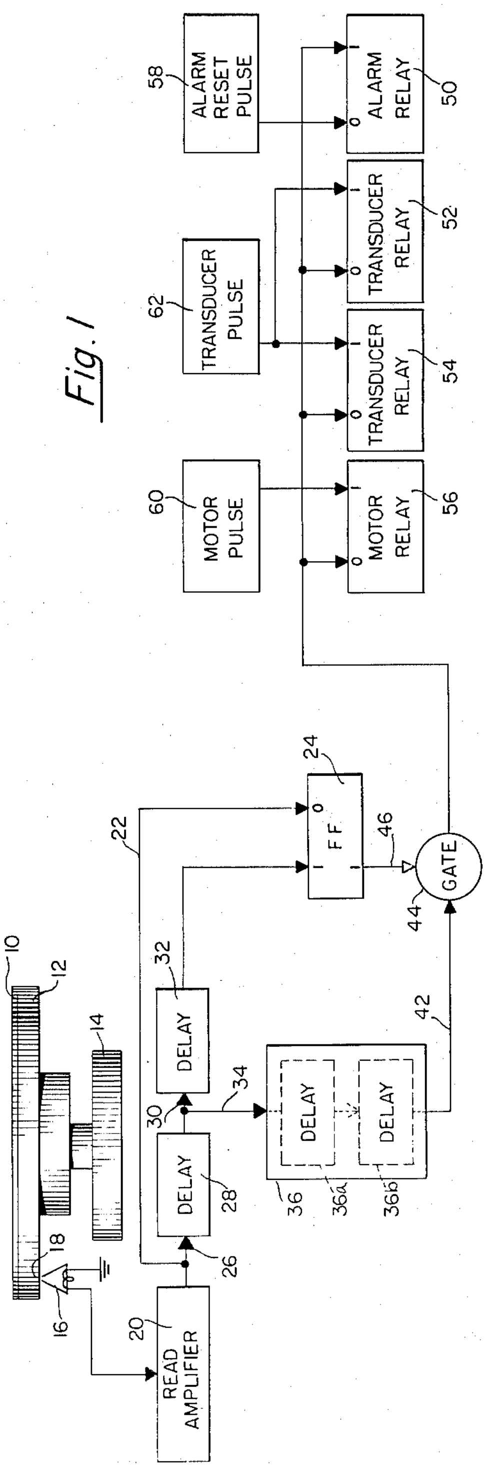
Fig. 1 illustrates one form of the invention capable of sensing a deviation in either direction from the intended normal rotational speed of the disk or other device.

Referring now to Fig. 1, there is shown a magnetic disk 10 supported by a turntable 12 which is driven at high rotational speed by motor 14. The undersurface of turntable 12 is provided with a magnetic surface on which timing and other data may be recorded. Head 16 represents a magnetic head positioned adjacent a track 18 on which one sync signal is assumed to be recorded. If desired, more than one sync signal may be recorded on the track; however, such sync signals should be uniformly spaced so that each signal read by head 16 represents a simple fraction of one revolution. For convenience, in the description which follows it will be assumed there is but one signal on track 18 so that head 16 reads one pulse for each revolution of the turntable.

The sync pulse read by head 16 is supplied to read amplifier 20 and the amplified sync pulse is applied, by way of lead 22, to an input terminal of a flip-flop circuit 24, the said input terminal being arbitrarily designated as the "0" terminal. The amplified sync pulse is also applied, by way of lead 26, to a delay circuit 28, and the output of delay circuit 28 is applied by way of leads 30 and 34 to delay circuits 32 and 36, respectively.

Delay circuits 28 and 32 may conveniently each be of the L-C delay line type, although other forms of delay devices, such as a multivibrator, a mercury delay line, or a magnetostrictive device, may be employed where suitable. Delay circuits 28 and 32 are each adjusted to provide in combination a delay equal to the deviation error which is to be tolerated in one direction from the normal constant rotational speed.

Delay circuit 36, on the other hand, provides a delay equal to the interval between sync pulses read from the turntable when the turntable is rotating at its intended constant speed. Where delay circuit 36 is of the multivibrator type, in order to avoid having a succeeding sync pulse applied to the multivibrator before delivery of the previous pulse is completed, it is necessary to use two multivibrators in series. This is indicated in Fig. 1 by the delay circuits **36*a* and 36*b* shown in dotted lines within the rectangle 36. Each of the multivibrators 36*a* and 36*b*** may introduce a delay equal to one-half the interval between sync pulses when the turntable is rotating at its intended speed.

The output pulse from delay circuit 36 is applied, by way of lead 42, to an input circuit of gate 44 which may be of any suitable type. Whether the delayed pulse on lead 42 passes through the gate 44 or is inhibited from passing therethrough, is dependent upon the state of the flip flop 24 at the time the delayed pulse is applied to the gate. As will be seen from Fig. 1, the state of the flip flop 24 is controlled, in one time period, by the sync pulses applied to its "0" input terminal directly from the read amplifier 20, and in another time period, by the delayed sync pulses applied to its "1" input terminal by way of the delay circuits 28 and 32. When the flip flop is in its "1" state, the D.-C. output level on lead 46 is such as to "open" the gate, i.e., is such as to condition the gate to pass any proper signal applied to its input circuit.

The operation of the circuit of Fig. 1 will now be described with the aid of the graphical illustrations of Fig. 2.

For the purpose of the present description, it will be assumed that the intended normal rotational speed of the turntable is 3500 r.p.m. Thus, one sync pulse should be read every 17 milliseconds. It will be further assumed that a rotational speed deviation of the order of 3 percent or 100 r.p.m. in each direction is to be tolerated, which, expressed in terms of sync pulses read will be assumed to be equal to a deviation of 0.5 millisecond in each direction.

Under the above assumptions, delay circuits 28 and 32 are each adjusted to introduce a delay of 0.5 millisecond while delay circuit 36 (comprising, in the case multivibrators are used, the two circuits **36*a* and 36*b*) is adjusted to introduce a delay of 17 milliseconds. Thus, in Fig. 1, each pulse applied to the "1" input terminal of the flip flop 24 by way of delay circuits 28 and 32 lags 1 millisecond behind the sync pulse which is applied to the "0" input terminal of the flip flop directly from the read amplifier circuit 20. The flip-flop circuit 24 itself introduces a delay which is negligible so far as the present discussion is concerned and it will be assumed, therefore, that the flip flop changes from one state to the other at the instant of arrival of a pulse at its input terminal. It will be seen, then, that the gate 44 is "open," i.e., is conditioned for passage of a pulse therethrough, at a time beginning 1 millisecond after delivery of the amplified sync pulse from the read amplifier 20, and that the gate continues to be open until the following amplified sync pulse is applied to the "0" input terminal of the flip flop. The delayed pulse which is applied to the input circuit of the gate 44, by way of lead 42, arrives 17.5 milliseconds after delivery of the amplified sync pulse from the read amplifier 20, having been delayed 0.5 millisecond in delay circuit 28 and 17 milliseconds in delay circuit 36**.

Figure 2:
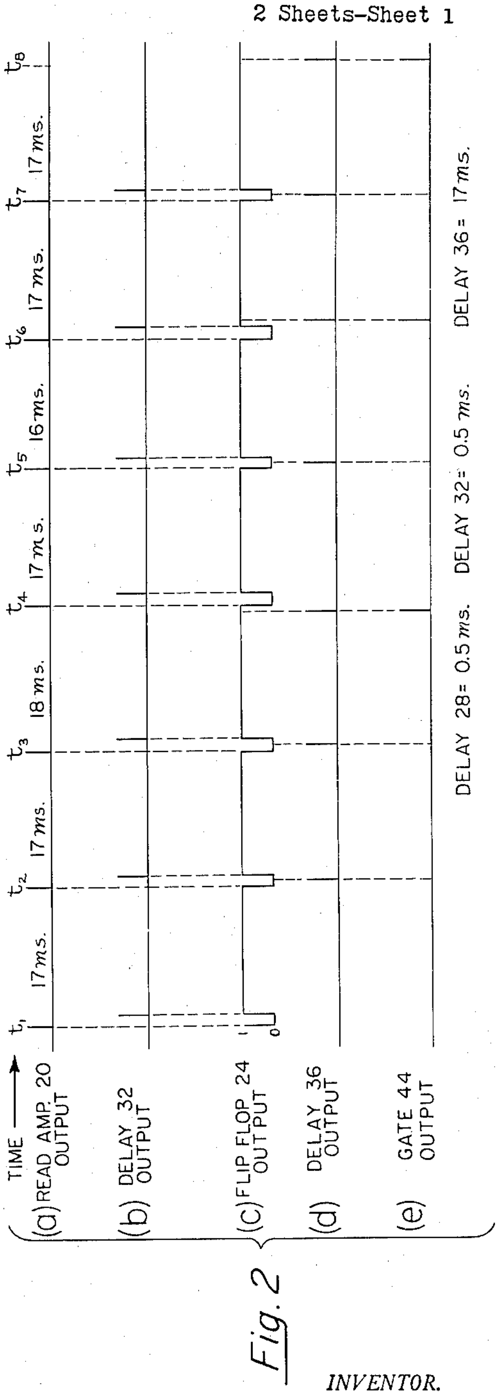
Fig. 2 is a graph which will be helpful in explaining the operation of the system of Fig. 1.

Referring now to Fig. 2, there is shown on line (*a*) a series of once-per-revolution sync pulses read from the track 18 and amplified by the read amplifier 20. To simplify the present discussion, it will be assumed that read amplifier 20 introduces no delay.

In order to illustrate the operation of the circuit of Fig. 1, the following will be assumed: The interval between sync pulses shown in Fig. 2 as read at times $t_1$, $t_2$ and $t_3$ is in each case 17 milliseconds, indicating that the turntable is rotating at its normal speed; the interval between sync pulses read at times $t_3$ and $t_4$ is 18 milliseconds, indicating that the turntable speed has decreased; the interval between pulses read at times $t_4$ and $t_5$ is 17 milliseconds, indicating that the turntable is again rotating at its proper speed; the interval between pulses read at times $t_5$ and $t_6$ is only 16 milliseconds, indicating that the turntable speed increased in this period; and the interval between pulses read at times $t_6$ and $t_7$ is 17 milliseconds, indicating normal speed. The assumption is then made that the sync pulse following the one read at time $t_7$ is missing due to a defect in the read circuit or other cause.

It will be understood that, as a practical matter, the turntable speed would be very unlikely to change as suddenly as is assumed in the foregoing and that these assumed speed deviations are merely for the purpose of illustrating the operation of the circuit of Fig. 1.

On line (*b*) of Fig. 2, are shown the pulses delivered from the delay circuit 32 and applied to the "1" input terminal of the flip flop 24. Each of these delayed pulses lags 1 millisecond behind the corresponding undelayed sync pulse.

On line (*c*) of Fig. 2, is shown the output from the flip flop 24. It will be seen that the flip flop is shifted to its "0" state at the time of each sync pulse shown on line (*a*) since these pulses are applied from the read amplifier 20 directly to the "0" input terminal of the flip flop. It will be further seen that the flip flop is shifted to its "1" state at the time of each delayed pulse shown on line (*b*) since these are applied from the delay circuit 32 to the "1" input terminal of the flip flop. Thus, the time period during which the flip flop 24 is in the "0" state is always 1 millisecond, as determined by delay circuits 28 and 32, and if a pulse be applied to the input circuit of the gate 44 during this 1 millisecond interval, the pulse will not pass through since the gate is closed. However, from the time that the flip flop is shifted to its "1" state by the application of a delayed pulse to its "1" terminal until the following sync pulse is applied to its "0" terminal, the flip flop is in the "1" state and the gate is open.

On line (*d*) of Fig. 2, are shown the delayed pulses delivered from the delay circuit 36 and applied by way of lead 42 to the input circuit of the gate 44. Each of these pulses lags 17.5 milliseconds behind the corresponding undelayed sync pulse shown on line (*a*) of Fig. 2, as determined by delay circuits 28 and 36. Thus, the first delayed pulse shown on line (*d*) is not applied to the input circuit of the gate 44 until 0.5 millisecond after the second undelayed sync pulse shown on line (*a*) is applied to the flip flop 24. And since the second undelayed sync pulse shifts the flip flop to its "0" state, which closes the gate, the first delayed pulse applied to the gate from delay circuit 36 fails to pass through. This is indicated on line (*e*) of Fig. 2 by the dotted pulse.

Similarly, the second delayed pulse from circuit 36 is not applied to the gate 44 until 0.5 millisecond after the third undelayed sync pulse is applied to the "0" input terminal of the flip flop. Thus, the second delayed pulse from circuit 36 finds the gate 44 closed and fails to pass through.

The third delayed pulse from circuit 36 arrives at the gate 17.5 milliseconds after the reading of the third sync pulse from the turntable. However, due to the slowing down of the turntable assumed for this period in the present discussion, the fourth sync pulse has not yet been read and, accordingly, the flip flop is still in its "1" state. Thus, the gate 44 is still open, and the third delayed pulse passes through the gate. This is indicated in Fig. 2 by the solid line pulse shown on line (e).

The fourth delayed pulse from circuit 36 finds the gate closed since the assumption has been made that the fifth sync pulse is read 17 milliseconds after the preceding pulse was read.

The fifth delayed pulse from circuit 36, however, finds the gate open since the assumption has been made that the turntable speed has increased in this period and that the sixth sync pulse is read only 16 milliseconds after the fifth. That the gate is open to the fifth delayed pulse will be seen from the following: The gate is always closed for a fixed period of 1 millisecond; in the present instance, this period begins 16 milliseconds after the preceding sync pulse was read; the gate is, therefore, again opened 17 milliseconds after the reading of the preceding (fifth) sync pulse; the fifth delayed pulse does not arrive until 17.5 milliseconds after the reading of the fifth sync pulse which is 0.5 millisecond after the gate, which had been closed for 1 millisecond, is again opened. Thus, the fifth delayed pulse finds the gate open and the pulse passes through. This is indicated in line (e) of Fig. 2 by the solid line pulse.

The sixth delayed pulse from circuit 36 again finds the gate closed since the assumption has been made that the seventh sync pulse is read a normal 17 milliseconds after the sixth.

The seventh delayed pulse, however, finds the gate open since the assumption has been made that the eighth sync pulse is missing. There being no eighth sync pulse, the flip flop remains in its "1" state and the gate 44 remains open. Thus, the seventh delayed pulse passes through the gate. This is indicated on line (e) of Fig. 2 by the solid line pulse.

The pulses which pass through the gate 44 may be used in any suitable manner to actuate an alarm and/or to actuate mechanism to pull away the magnetic heads and/or to shut off the motor. In Fig. 1, the pulses passing through the gate 44 are shown applied to the "1" terminal of the pulse-operated relay circuit 50 and also to the "0" input terminals of pulse-operated relay circuits 52, 54 and 56. The application of the pulse to the "1" input terminal of the pulse-operated relay circuit 50 is effective to actuate the relay to sound an alarm, while the application of the pulse to the "0" input terminals of pulse-operated relay circuits 52 and 54 is effective to release the relays to effect withdrawal of the magnetic heads from the disk surface and from the undersurface of the turntable. The application of the pulse to the "0" input terminal of pulse-operated relay circuit 56 is effective to release the relay, thereby to disconnect the motor circuit.

Once the alarm condition has been noted, a manually-operated push-button pulse generator 58 may be used to deliver a pulse to the "0" input terminal of the pulse-operated relay 50 to reset the alarm. When the apparatus is to be again operated, push-button pulse generator 60 may be used to deliver a pulse to the "1" input terminal of pulse-operated relay circuit 56 to energize the relay to close the motor circuit. After the turntable has come up to speed, the push-button pulse generator 62 may be used to deliver a pulse to the "1" input terminal of each of the pulse-operated relay circuits 52 and 54 to energize the relays to pull in the upper and lower magnetic heads.

Where a change of speed in one of the two directions is of no interest, and a warning signal is desired only if the speed should change in the other direction, the circuit shown in Fig. 1 may be simplified and one of the delay circuits omitted. Such a circuit is shown in Fig. 3.

Figure 3:
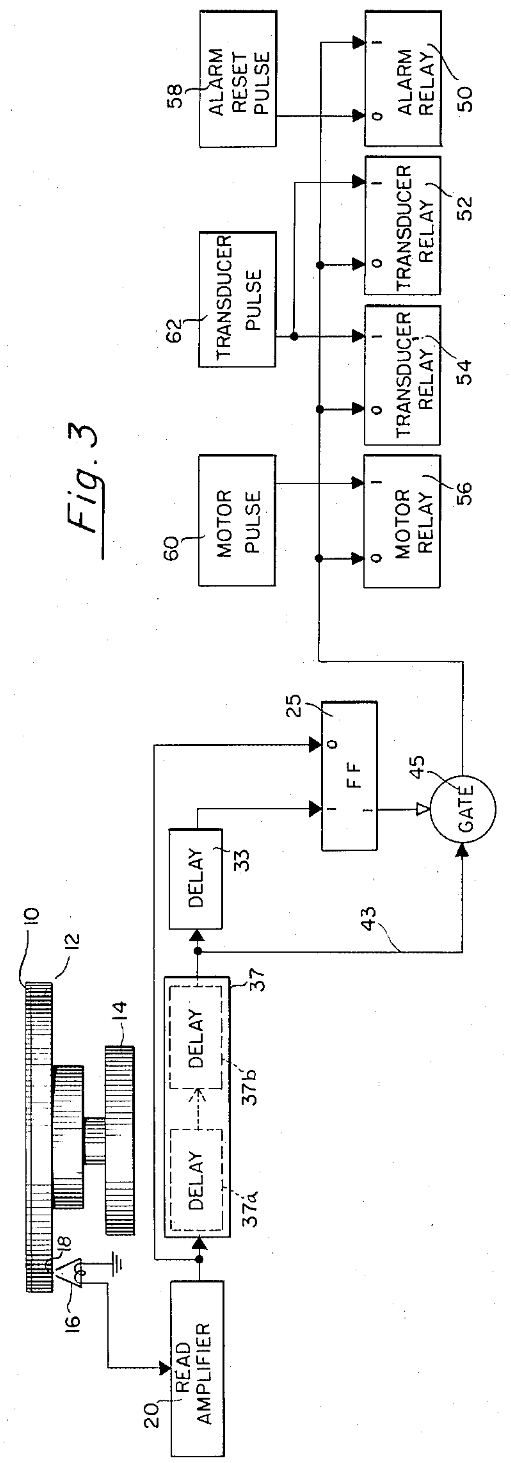
Fig. 3 illustrates another form of the circuit of the invention which may be used when it is necessary to sense a deviation in one direction only from the intended normal rotational speed of the disk or other device.

Referring now to Fig. 3, there is shown a circuit adapted to deliver a warning signal in the event the rotational speed of the turntable should decrease by more than a chosen tolerance below its intended normal speed. In the circuit of Fig. 3, the sync signal from read amplifier 20 is applied directly to the "0" input terminal of the flip flop 25, the same as it is in the case of Fig. 1. Also, as in the case of Fig. 1, the delayed pulse which is applied to the input circuit of the gate 45 is delayed by a period equal to the interval between sync pulses when the turntable is rotating at its normal speed plus a portion of the total deviation error which is to be tolerated. This delay is achieved by passing the sync pulse through the delay circuits 37a and 37b. If we again assume that the normal rotational speed of the turntable is such that the interval between sync pulses should be 17 milliseconds, the delay introduced by the circuits 37a and 37b should total 17.5 milliseconds.

In contradistinction to the circuit of Fig. 1, the delay introduced to the pulse which is applied to the "1" input terminal of the flip flop is, in the circuit of Fig. 3, substantially longer than that which is introduced in the circuit of Fig. 1. It will be recalled that in Fig. 1, the delay was only 1 millisecond, being equal to the total deviation error to be tolerated in both directions. In the circuit of Fig. 3, the delay is greater than the interval between sync pulses when the turntable is rotating at its normal speed. Assuming the normal speed to be as indicated hereinbefore, the pulse applied to the "1" input terminal of the flip flop is, in the circuit of Fig. 3, delayed for 18 milliseconds.

Figure 4:
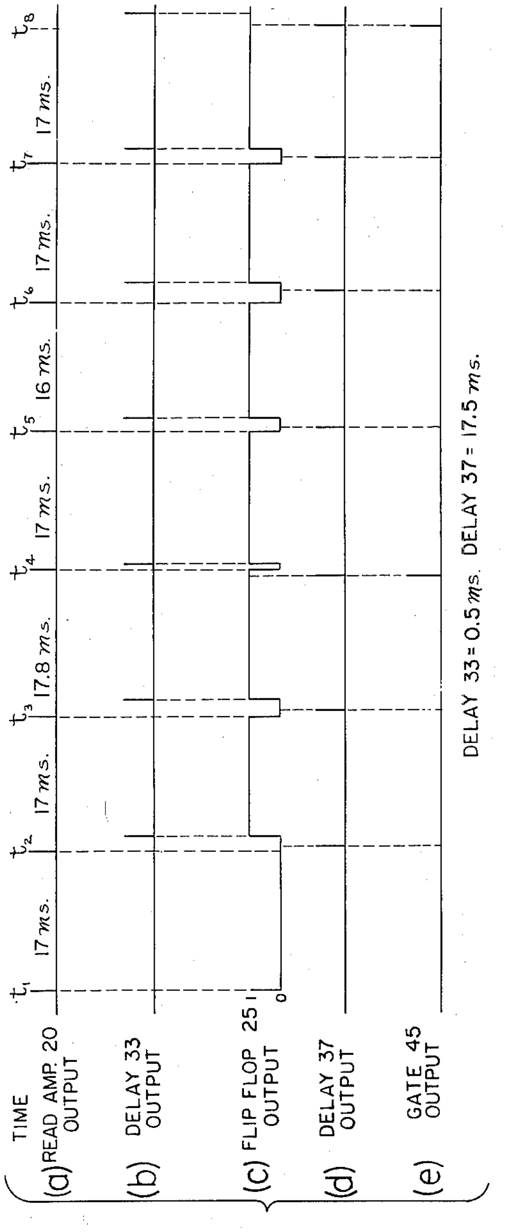
Fig. 4 is a graph which will be helpful in explaining the operation of the system of Fig. 3.

The operation of the circuit of Fig. 3 will now be briefly described with the assistance of the time graph shown in Fig. 4. In Fig. 4 there is shown in line (a) a series of sync pulses read from the turntable, the intervals between the various sync pulses being assumed to be the same as in the case of Fig. 2. These intervals are noted on Fig. 4.

As in the case of Fig. 2, the flip flop 25 of Fig. 3 is seen to be shifted to its "0" state in response to each sync pulse applied directly to its "0" input terminal from the read amplifier 20.

On line (b) are shown the delayed pulses which are applied to the "1" input terminal of the flip flop 25 and in response to which the flip flop changes to its "1" state.

On line (c) is shown the output waveform from the flip flop 25 as applied to the gate 45.

And, on line (d) are shown the delayed pulses which are applied to the input circuit of the gate 45 by way of lead 43. Each of these delayed pulses is applied to the input circuit of the gate 17.5 milliseconds after the delivery of the undelayed sync pulse from the read amplifier 20.

In Fig. 4, the interval between the first and second, and the second and third, sync pulses is in each case a normal 17 milliseconds. Thus, the first delayed pulse from delay circuit 37 finds the gate 45 closed by the first and second undelayed sync pulses, and the second delayed pulse finds the gate closed by the third undelayed pulse. These pulses, therefore, fail to pass through. The fourth sync pulse, however, is not read until 17.8 milliseconds after the reading of the third sync pulse. Accordingly, the third delayed pulse, which is applied to the input circuit of the gate 17.5 milliseconds after the third sync pulse is read, finds the gate open since the flip flop 25 is still in its "1" state. Consequently, the third delayed pulse passes through. This is indicated on line (e) of Fig. 4 by the solid pulse. The fourth delayed pulse again finds the gate closed since the fifth sync pulse has been assumed to be on time. The fifth delayed sync pulse, which is applied to the gate 17.5 milliseconds after the fifth sync pulse is read, also finds the gate closed. The fact that the sixth sync pulse is read only 16 milliseconds after the reading of the fifth sync pulse, which is 1 millisecond earlier than normal, does not have the effect of opening the gate to the fifth delayed pulse as is seen from the following: The sixth sync pulse, though early, changes the flip flop to the "0" state which closes the gate, and the gate remains closed until the arrival of the delayed pulse at the "1" input terminal of the flip flop; however, the delayed pulse does not arrive at the "1" input terminal until .5 millisecond after the arrival of the delayed pulse at the input circuit of the gate; thus, the gate is still closed at the time of arrival of the input pulse. Thus, the pulse does not pass through the gate and no warning pulse is made available despite the fact that the speed of the turntable has substantially increased. As previously indicated, the circuit of Fig. 3 is a simplified circuit useful in those instances where protection against decreased speed only is necessary or desired. This is the situation in the case of the magnetic-disk memory using self-generated air floating for the heads.

Returning again to Fig. 4, the seventh sync pulse is assumed to be read a normal 17 milliseconds after the preceding (sixth) pulse, and the sixth delayed pulse applied to the gate finds the gate closed and fails to pass through. The next or seventh delayed pulse applied to the gate finds the gate open, however, since the assumption has been made that the eighth sync pulse is missing. With the eighth sync pulse missing, the flip flop remains in the "1" state in which it was placed by the sixth delayed pulse, and the gate remains open. The seventh delayed pulse thus passes through.

The pulses which pass through the gate 45 of Fig. 3 may be used as an alarm signal in a manner similar to that indicated with respect to the circuit of Fig. 1.

It will be seen from the foregoing description of the circuits of Figs. 1 and 3 that the present invention provides an electronic system for developing a signal to indicate that the speed of a rotating device has departed from its normal speed by an amount in excess of the error to be tolerated.

It will be understood that while the invention has been described with specific reference to a magnetic-disk system, the broader aspects of the invention do not require that the sync signal be magnetically recorded nor read by electromagnetic transducing means. For example, the sync signal could be of a type to actuate a photoelectric cell or other light-responsive means.

It will also be understood that while the invention has been described with specific reference to a rotational device, the means provided by the invention may also be used to detect deviations in the periodicity of other forms of motion intended to have a regular period, as for example, a reciprocating or pendulum motion.

What is claimed is:

1. Electronic apparatus for detecting deceleration beyond a fixed tolerance in a rotating disk intended to rotate at a normal constant speed and having a magnetizable surface on which a marker signal is inscribed, said detecting apparatus comprising: means responsive to said marker signal for deriving a pulse for each revolution; a flip flop having first and second stable states of condition; means for applying said pulse to one input circuit of said flip flop to place said flip flop in said first stable state; first delay means; means for applying said pulse to said first delay means for delaying said pulse for an interval longer than the period between said pulses when said disk is rotating at its normal speed but shorter than the sum of said normal interval and said fixed tolerance; additional delay means for introducing an additional delay equal to the amount by which said first delay is shorter than said sum; means for applying the output of said first delay means to said additional delay means; means for applying the output of said additional delay means to the other input circuit of said flip flop to place the flip flop in said second stable state; means for deriving an output from said flip flop when said flip flop is in its said second stable state; a gate; means for applying said last mentioned output of said flip flop to said gate to condition said gate to pass signals through said gate when said flip flop is in its said second stable state and to inhibit passage of signals therethrough when said flip flop is in its said first stable state; means for applying the output of said first delay means to said gate; and means for utilizing the output of said gate as an alarm signal indicating that the speed of said disk has decreased by more than said tolerance.

2. Electronic apparatus for detecting deviation beyond tolerance in either direction in a rotational disk having a normal speed of rotation, said detecting apparatus comprising: a magnetic marker on said disk; transducer means responsive to said marker for developing one signal for each revolution; a flip flop having first and second stable states of conduction; means for applying said developed signal to said flip flop to place said flip flop in said first stable state; first delay means having tap means disposed between the input and output thereof; means for applying said developed signal to said first delay means for delaying said signal by an interval equal to the deviation to be tolerated; means for applying the output of said first delay means to said flip flop to place said flip flop in said second state; gating means; means connecting the output of said flip flop to said gating means for conditioning said gating means to pass signals applied thereto when said flip flop is in said second stable state; second delay means; means coupling said second delay means to said tap means for delaying said developed signal by an interval equal to the normal interval between signals when said device is rotating at its normal speed; means for applying the output of said second delay means to an input circuit of said gating means; and means for utilizing the output of said gating means as a signal indicating that the speed of said device has deviated from normal by an amount in excess of the error to be tolerated.

3. Electronic apparatus for detecting deviation beyond tolerance in a rotational device having a normal speed of rotation, said detecting apparatus comprising: a marker on said rotating device; means responsive to said marker for developing one signal for each revolution; a flip flop having first and second stable states of conduction; means for applying said developed signal to said flip flop to place said flip flop in said first stable state; first delay means having tap means disposed between the input and output thereof; means for applying said developed signal to said first delay means for delaying said signal by an interval equal to the deviation to be tolerated; means for applying the output of said first delay means to said flip flop to place said flip flop in the said second stable state; gating means; means connecting said flip flop to said gating means for conditioning said gating means to pass signals applied thereto when said flip flop is in said second stable state; second delay means; means coupling said tap means to said second delay means for delaying said signal by an interval equal to the normal interval between signals when said device is rotating at its normal speed; means for applying the output of said second delay means to an input circuit of said gating means; and means for utilizing the output of said gating means as a signal indicating that the speed of said device has deviated from normal by an amount in excess of the error to be tolerated.

4. Electronic apparatus for detecting deviation in either direction beyond tolerances in the rotational speed of a device having a normal speed of rotation, said detecting apparatus comprising: a marker on said rotating device; means responsive to said marker for developing one electronic signal for each revolution of said device; an electronic gate having input and output circuits; means for utilizing said developed signal to close said gate; first delay means having tap means disposed between the input and output thereof; said first delay means coupled to said responsive means for delaying said developed signal by an interval equal to the total deviation to be tolerated; means for utilizing said delayed signal from said first delay means to open said gate; second delay means coupled to said tap means for delaying said developed signal by an interval equal to the normal interval between signals when the device is rotating at its normal speed; means for applying delayed signals from said second delay means to an input circuit of said gate; and means for connecting the output circuit of said gate to indicating means to indicate when the rotational speed of said device has deviated in either direction from normal by an amount exceeding the tolerance.

5. A device for detecting generated signals which have a preferred predetermined period of generation and a tolerable deviation period therefrom comprising a source of signals, first signal delay means having input means, output means and tap means associated therewith, said first signal delay means to delay a signal applied thereto for a period of time which is longer than said preferred predetermined period but shorter than the summation of said preferred predetermined period and said tolerable deviation, said tap means disposed along said first signal delay means to provide a delayed signal therefrom which has been delayed for a period of time which is a fraction of said tolerable deviation, second signal delay means coupled to said tap means, said second signal delay means to delay a signal applied thereto for a period of time which is the difference between said fraction and said total tolerable deviation, switching means coupled to said second delay output and said signal source to provide respectively a first and second output signal in response thereto, signal comparison means coupled to said first signal delay means and said switching means to compare said second signal output and the output from said first signal delay means to provide an error signal when said generated signals have a period of generation which differs from the preferred period by an interval of time exceeding said tolerable deviation.

6. A device for detecting signals according to claim 5 wherein said switching means is a bistable multivibrator and wherein said comparison means includes a gating device and an error signal indicative means coupled thereto.

7. Electronic apparatus for detecting deviation beyond tolerance in the period of movement of a device having a normal period of movement, said detecting apparatus comprising a marker on said moving device, means responsive to said marker for developing one signal for each periodic movement of said device, an electronic gate, means for utilizing said developed signal to close said gate, first delay means for delaying said developed signal by an interval equal to X% of the deviation to be tolerated, means for utilizing said delayed signal from said first delay means to open said gate, second signal delay means coupled to said responsive means for delaying said developed signal by an interval equal to the normal interval between developed signals when the device is moving at its normal period plus an interval equal to (100–X) percent of the deviation to be tolerated, means connecting said first delay means to said second delay means to receive each of said developed signals therefrom after each has been delayed a predetermined time, means for applying delayed signals from said second delay means to said gate for passage therethrough when said gate is opened, and means for utilizing the output of said gate as a signal indicating that the period of movement of said device has deviated from normal by an amount exceeding said tolerance.

8. A device for detecting signals which have a preferred period of generation and a tolerable deviation period therefrom comprising a source of signals, an electronic gate, first circuitry means connecting said source to said gate to close said gate in response to a signal from said source, first signal delay means connected to said source to delay a signal for a period of time equal to said preferred period plus X% of said tolerable deviation period, second signal delay means connected through said first signal delay means to said signal source, said second signal delay means to delay a signal applied thereto for a period of time equal to (100–X) percent of said tolerable deviation period, second circuitry means coupling the output from said second signal delay means to open said gate so that said gate remains open for a period of time equal to said tolerable deviation, and third circuitry means connecting said first signal delay output to said electronic gate for passage therethrough when said electronic gate is open.

9. A device for detecting signals which have a preferred period of generation and a tolerable deviation period comprising a source of signals, first signal delay means, said first signal delay means coupled to said source of signals to delay a signal therefrom for a time interval equal to said preferred period plus X% of said tolerable deviation period, second signal delay means to delay a signal applied thereto for a period of time which is equal to (100–X) percent of said tolerable deviation period, said second signal delay means connected to a selected output point on said first signal delay means to receive therefrom each signal applied thereto after it has been delayed a predetermined period, switching means coupled to said source of signals and said second signal delay means output to provide a first and second signal respectively in response thereto, and comparing means coupled to said first signal delay means output and said switching means to compare signals applied therefrom.

References Cited in the file of this patent

UNITED STATES PATENTS

| | | |
|---|---|---|
| 2,719,286 | Teeson | Sept. 27, 1955 |
| 2,730,698 | Daniels et al. | Jan. 10, 1956 |
| 2,740,108 | Plympton | Mar. 27, 1956 |
| 2,786,978 | Warner | Mar. 26, 1957 |
| 2,876,058 | Kenosian et al. | Mar. 3, 1959 |